United States Patent [19]

von Bonin

[11] Patent Number: 4,729,853

[45] Date of Patent: Mar. 8, 1988

[54] FLAME-RETARDING SEALING COMPOUNDS

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 884,445

[22] Filed: Jul. 11, 1986

Related U.S. Application Data

[63] Continuation of Ser. No. 699,900, Feb. 8, 1985, abandoned.

[30] Foreign Application Priority Data

Feb. 27, 1984 [DE] Fed. Rep. of Germany ....... 3407007

[51] Int. Cl.$^4$ .................... C09K 21/00; C09D 5/16; C09D 5/18; C04B 7/02
[52] U.S. Cl. .................... 252/601; 106/18.11; 106/18.13; 106/18.14; 106/18.21; 106/18.31; 106/90; 106/97; 252/602; 252/607; 252/609; 428/920; 428/921; 521/907; 523/179
[58] Field of Search ............... 252/601, 607, 609, 602; 106/15.05, 90, 18.11, 18.13, 18.14, 97, 18.21, 18.31; 428/920, 921, 411.1; 52/317; 260/DIG. 24; 521/907, 103, 106; 523/179

[56] References Cited

U.S. PATENT DOCUMENTS

| | | | |
|---|---|---|---|
| 3,925,137 | 12/1975 | Kamei | 156/278 |
| 3,955,987 | 5/1976 | Schaar et al. | 106/16 |
| 3,988,289 | 10/1976 | Clark et al. | 106/90 |
| 4,075,155 | 2/1978 | Phillipps | 106/90 |
| 4,152,320 | 5/1979 | Shapiro et al. | 252/601 |
| 4,161,855 | 7/1979 | Mulvey et al. | 106/88 |
| 4,270,954 | 6/1981 | Aignesberger et al. | 106/47 R |
| 4,438,028 | 3/1984 | Schmittman et al. | 252/609 |
| 4,443,520 | 4/1984 | Braithwaite, Jr. | 428/438 |
| 4,486,553 | 12/1984 | Wesch | 523/179 |

OTHER PUBLICATIONS

Hawley, G. 1981, The Condensed Chemical Dictionary, 10th edition Van Nostrand Reinhold Co., New York, p. 649.

*Primary Examiner*—Stephen J. Lechert, Jr.
*Assistant Examiner*—Howard J. Locker
*Attorney, Agent, or Firm*—Sprung Horn Kramer & Woods

[57] ABSTRACT

Flame-retarding sealing compounds based on hydraulic binders are described which are characterized by a content of dehydratable fillers and melamines.

5 Claims, No Drawings

FLAME-RETARDING SEALING COMPOUNDS

This is a continuation of application Ser. No. 699,900, filed 2-8-85 now abandoned.

The present invention relates to flame-retarding sealing compounds with improved properties based on hydraulic binders.

Mortars and concretes bonded using cement, gypsum, Mg oxychloride or other hydraulic binders, and the binders themselves are often used for sealing fractures in walls in a flame-retarding manner.

As these materials lose their water of hydration under the influence of fire, satisfactory action against the passage of heat is achieved in the event of a fire. The insulating capacity of these sealing compounds is relatively low even if they are made porous, for example by the addition of a large amount of mixing water or porous fillers.

On the other hand, inadequate thermal conductivity of these sealing compounds is not desired, because, for example it is advantageous if the heat from cables in a cable duct sealed with such sealing compounds can be carried off or otherwise absorbed in the still cool wall in the event of fire.

It is therefore desirable to combine two opposing properties in these sealing compounds: on the one hand useful insulating capacity and on the other hand the capacity to absorb heat.

The strength and the bond should be retained for as long as possible in the event of flaming, otherwise the strength should be moderate, for example to allow simple reinstallation of cable ducts. Finally, the sealing compound should have a minimal tendency to fracture in the event of fire and it should also be possible to adjust the sealing compound so that it does not give off dust.

A sealing compound of this type must be capable of neutralizing, in the event of fire, hydrogen halide gases of the type formed during the combustion of PVC cable sheaths, for example.

It has now surprisingly been found that these requirements can be met by using as sealing compounds mortars or concretes based on hydraulic binders which, in addition to the binder, contain dehydratable, non-hydraulically setting fillers and melamine as well as optionally further auxiliaries and fillers. Calcium sulphate (gypsum) having a wide variety of dehydration stages is particularly suitable as the binder in this case. Sealing compounds containing the melamine plus dehydratable filler in an equal or greater quantity based on the hydraulic binder are particularly advantageous.

Porous fillers such as wood, perlite, vermiculite, zeolite, glass foam, expanded graphite, silicate hollow beads, light expanded clay aggregate etc, polystyrene foam, cork, wood, polyurethane foam etc, are suitable as optional additional fillers in addition to the conventional fillers such as sand, alumina, silicas and chalks.

It is interesting that the setting capacity of the hydraulic binders, in particular of gypsum or anhydrite is surprisingly not reduced even by very high additions of melamine.

It has also surprisingly been found that although gypsum itself is a dehydratable material, a combination of gypsum with, for example, Al hydroxide as dehydratable filler and melamine leads to a superior fire resistance capacity.

It is also interesting that, in the event of fire, the cohesion of the sealing compounds according to the invention can be maintained by additions of phosphoric acid forming agents or phosphates, the fire resistance capacity can be increased and the susceptibility to fracture can be reduced.

Finally, elastification and adjustment of the sealing compounds so that they do not raise dust during reinstallation and surprisingly an increase in the fire resistance period of the sealing compounds according to the invention are achieved by additions of plastics lattices in particular those having a pronounced tendency to film formation, even at low temperatures of about 0° C.

The melamine content of the sealing compounds prevents the plastics content of the lattices from impairing flame resistance in the event of fire.

During thermal decomposition in the event of fire, the melamine simultaneously causes basic gases to be given off which are capable of bonding hydrogen halides as ammonium salts and this is a significant factor in the field of electrical installations.

Moreover, the melamine consumes energy during this decomposition process, which is of an endothermic nature, also during the melting and sublimation, causing a heat discharge mechanism independent of the dehydration of the sealing compound and its fillers to come into effect. Even if more than 80% by volume of the sealing compound are composed of melamine, there remains after the melting, sublimation and decomposition of the melamine, which surprisingly takes place with production of the binder framework and with considerale heat uptake, a highly porous residual material which has excellent insulating properties and is capable of setting a considerable resistance against the fire or the propagation of heat, particularly in the presence of phosphoric acid donors.

The surprisingly synergistic combination of various advantages opens up particular applications for the sealing compounds according to the invention wherever it is necessary to achieve protection which is as reliable as possible but can be re-installed, against the passage of fire and heat even when the walls are relatively thin. These applications may concern the filling of cracks in walls, sealing joints or surface applications on endangered substrates or may include board-form products or shaped articles with or without surface coatings which are produced from the sealing compounds according to the invention.

The flame-retarding sealing compounds according to the invention based on hydraulic binders are characterised in that they contain dehydratable fillers and melamine in addition to further optional fillers and other auxiliaries.

The present invention relates to flame-retarding sealing compounds based on hydraulic binders, optionally mixed with other fillers and other auxiliaries, characterised in that they contain additions of melamine and dehydratable fillers.

Sealing compounds which are characterised in that they contain at least an equal quantity by weight of melamine plus dehydratable filler to the quantity of binder are preferred.

Sealing compounds containing phosphoric acid donors as auxiliary are also preferred.

Sealing compounds containing polymer dispersions as auxiliary are also preferred.

Sealing compounds containing fillers having pores or cavities as further filler are also preferred.

However, the invention also relates to panels, sandwiched materials, finished articles, semi-finished products and joint or cavity fillings, in other words devices which provide preventive fire protection and have been produced using the flame-retarding sealing compounds described above.

Hydraulic binders are those which are initially present in any deformable shape and which solidify after addition of water or water-containing additives.

These are preferably inorganic binders such as magnesium chloride cements, portland cements, pozzuolana cements, blast furnace cements, so-called rapid cements, metal oxide cements etc. Calcium sulphate binders such as α-gypsum, β-gypsum, plaster of Paris, plastering gypsum or anhydrite are particularly suitable owing to the high water of hydration content in bound form and owing to the good processing behaviour. Conventional plaster of Paris is particularly suitable, optionally in retarded form.

The hydraulic binder should be contained in quantities of from 3 to 90, preferably from 10 to 50% by weight in the dry sealing compounds.

In addition to mineral fibres, glass fibres, carbon fibres or organic fibres, other suitable fillers include those which exist in the form of a granulate, powder, small rods, small strips, small leaves or in various crystalline forms or those capable of existing as foam, beads or hollow beads.

Dehydratable or ammonia-releasing fillers which, in turn, "consume" heat by a decomposition reaction or water cleavage or evaporation at temperatures of between 100° C. and 700° C., preferably 120° C. and 400° C. are of particular interest according to the invention.

These fillers include alkali slicates, zeolites or other hydrated phosphates, silicates, borosilicates or borates, aluminium hydroxides, cyanuric acid derivatives and analogues of the type mentioned in unpublished German Patent Application No. 3 302 416, such as phenol, melamine or urea formaldehyde resins, graphites and mica which are capable of swelling, vermiculites and perlites, minerals containing water of crystallization such as aluminohydrocalcite, artinite, dawsonite, ettringite, hydrocalumite, hydroganate, hydromagnesite, hydrotalkite, nesquehonite, scarbroite, thaumasite and wermlandite. Aluminium hydroxide or aluminium hydrated oxides or hydrated aluminas are of particular interest.

Dehydratable fillers are not usually capable of setting hydraulically themselves.

They are contained in the fire prevention sealing compounds according to the invention in quantities of from 0.5 to 80, preferably from 20 to 60% by weight.

Other fillers which are of interest are those which exist in porous, foamed or hollow bead form and are of an organic or, in particular, inorganic nature and have already been mentioned at the outset by way of example.

The other fillers can be contained in the fire prevention compounds in quantities of from 80 to 0% by weight, preferably 60 to 0% by weight. High filler contents of this type are used if a fire prevention sealing compound which can be drilled relatively easily, ie. is relatively soft, is desired.

Other auxiliaries include accelerators or retarding agents of the type known in hydraulic binder technology as well as flow auxiliaries, foam and pore forming agents, hydrophobizing agents, thickeners and liquefiers, shielding aids such as boron compounds, polyethylene, heavy metals, corrosion prevention agents, biocides, odourous substances, dyes and pigments, but particularly phosphoric acid donors.

Suitable phosphoric acid donors include, in addition, for example, to red phosphorus itself, organic or inorganic phosphorus-containing compounds, for example alkali phosphates and, in particular, amine salts or ammonium salts of phosphoric acids. These phosphoric acid donors are, for example, phosphoric acid esters, phosphonic acids, phosphinic acids, phosphacenes, but also alkali phosphates or polyphosphates suitable for phosphoric acid cleavage such as $Na_2HPO_4$ or potassium metaphosphates or pyrophosphates.

However, acidic, basic or predominantly neutrally reacting salts of amines with phosphoric acids are particularly suitable. Organic or inorganic acids with various valency states of phosphorus, but particularly orthophosphoric acid are understood as phosphoric acids in addition to poly, pyro and metaphosphoric acid.

Ammonia, ethylene diamine and melamine, in particular, are used as amines for the purpose according to the invention owing to their availability and suitability, but all other compounds which are capable of forming adducts with phosphoric acids, in particular compounds which contain nitrogen, in other words polymeric compounds such as basic urea resins, melamine resins, phenol resins, styrene resins and albumen resins are also of interest.

Mono or diammonium-orthophosphate, the neutralisation product of ethylene diamine and ortho-phosphoric acid or the adduct of from 0.1 to 3, preferably from 0.5 to 1 mol of orthophosphoric acid and melamine is usually used.

The phosphoric acid donors are contained in the fire-proofing compounds according to the invention in quantities of from 0.3 to 70% by weight, preferably from 5 to 35% by weight.

Auxiliaries also include additives of plastics, synthetic resins, oils of any viscosity, in particular in the form of polymer dispersions. In addition to the surprising property of increasing the fire-resistance, these auxiliaries have the property of imparting a certain elasticity to the sealing compounds which serves the purpose of preventing dust from being raised in the event of re-installation during which the sealing compounds may have to be drilled again. This means that, in addition to dispersions of fairly highly viscous oily tacky compounds, bitumen, polyisobutylene, polyethers, polyesters, hydrocarbon polymers, tars, resins, petroleum fractions, in particular polymer dispersions which are stable to electrolytes and have a film-forming temperature of between $-15°$ C. and $+40°$ C., in particular, 0° and 20° C., in other words the temperature at which such a dispersion dries to form a closed film can be used. These polymer dispersions can be made up, for example, on the basis of polyurethane, on the basis of olefin, (meth)-acrylate, vinylester or polyvinyl halide or chloroprene copolymers.

Dispersions of polyurethanes, butadiene copolymers, vinylantate copolymers and polyacrylic acid esters which are stable to electrolytes are particularly suitable.

These dispersions can preferably be added to the mixing water.

The plastics introduced into the sealing compounds according to the invention in the dry state are contained in quantities of from 0.0 to about 60, preferably from 3 to 30% by weight.

The fact that the melamine fractions contained in the sealing compounds according to the invention can suppress, in an excellent manner, the tendency of the plastics to contribute in the case of fire to inflammation of the sealing compound is an advantage.

Melamine is preferably understood to mean the fundamental substance 2,4,6-triamino-s-triazine, but, for example, the condensation products thereof obtainable by thermal treatment or reaction with formaldehyde can be used or even the salts thereof, for example, phosphates.

In the context of the invention, the term melamine also covers cyanuric acid derivatives, ie. the following compounds can be used according to the invention as cyanuric acid derivatives: cyanuric acid and/or its derivatives, ie. cyanuric acid or compounds which can be understood as cyanuric acid or isocyanuric acid derivatives. These include cyanamide, dicyanamide, dicyandiamide, guanidine and the salts thereof, biguanide, urazole, urazolecyanurate, melamine cyanurate, cyanuric acid salts and cyanuric acid esters and amides.

In the context of the invention, these also include urea, hydrazodicarbonamide, guanidine, allophanate, biuret, dicyandiamide, the polycondensation products thereof and predominantly the formaldehyde condensation products thereof which are insoluble in water.

Melamine is preferably used as it is readily available and is insensitive to water.

The melamine is contained in the sealing compound according to the invention in quantities of 0.25 to 80, preferably from 10 to 60% by weight.

The quantities of dehydratable filler plus melamine contained in the fire-proofing sealing compounds according to the invention are from 0.5 to 99, preferably from 10 to 90% by weight, in particular they are at least equal to the binder content.

All percentages mentioned in this description add up with the binder content of from 0.5 to 90, preferably from 3 to 50% by weight in the sealing compound to a total of 100% by weight (without water content).

The fire-proofing sealing compounds according to the invention are initially present as a powdered mixture of components, but are then mixed with water and/or dispersions or solutions of auxiliaries and are used in the desired form and consistency which is set hydraulically or solidifies physically by drying as a pourable compound or paste for sealing joints or openings and optionally also for coating surfaces of building parts or other devices such as cables or cable lines, optionally also for producing panels, profiles or other shaped articles which are used predominantly for fire-prevention and are optionally reinforced with metal grids, mineral or glass fibres, wood or cellulose fibres, carbon fibres, aramide fibres or other fibres, yarns, woven, knitted or non-woven fabrics.

As the use of polymer dispersions, in addition to good elastification, also leads to good adhesion of the sealing compounds on organic and inorganic substrates, they can also be used for lining or coating for example, casings or casing parts, cables or cable lines, walls and floors.

The invention will be described by way of example below and the specified parts and percentages are parts by weight unless otherwise stated.

EXAMPLES

The components of the recipe were firstly premixed as a powder according to the following Table and then thoroughly stirred for 5 minutes with a stirrer with addition of the mixing water and polymer latex to form a homogeneous pourable mixture.

This mixture was poured into moulds and cured to form boards measuring $20 \times 20 \times 2$ cm. The boards were dried at 75° C. in a drying chamber to a constant weight.

The boards were then subjected to a flame treatment in their geometric center from below with a firmly adjusted Meker petroleum burner, 25 mm $\phi$ flames, with a distance of 2.5 cm between the burner surface and the test board, produced by K K Juchheim OHG, Bernkastel-Kues am Rhein. A 2.5 cm $\phi$, 3 cm high glass cylinder open at both ends was placed on the top of the board directly above the flame center and was filled with $Al_2O_3$ powder produced by the company Merk, Darmstadt, and standardized according to Brockmann. A mercury thermometer was then lowered down the axis of the cylinder to the surface of the board so that the tip of the thermometer was completely surrounded by $Al_2O_3$ powder.

The capacity of the various test boards to transmit heat to the environment can be subjected to excellent comparison tests using this relatively functioning test arrangement if the times from the beginning of the flame treatment until the thermometer indicates 100°, or 150°, or 180° C. are determined.

These measured values are also compiled in the Table.

Conventional commercial plaster of Paris was used as gypsum and, in the cases marked with an asterisk, "smooth-plaster" produced by Wülfrather Kalkwerke was used as the gypsum.

Diammonium orthophosphate was used as phosphate and Martifin produced by Martinswerke AG was used as Al-hydroxide.

Hollow aluminosilicate beads having a diameter below 0.5 mm and a bulk density of 300 g/l were used as hollow Si beads.

A polyurethane latex produced by Bayer AG, 50% PU-dispersion DLS, diluted to 20%, was used as polymer latex.

| Example No | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Parts by weight gypsum | 64.3 | 7.1 | 6.1 | 5.5 | 6.5 | 7.5 | 7.5 | 30 | 30 | 460* | 460* | 460** | — | 300 | 300 |
| Parts by weight Portland cement | — | — | — | — | — | — | — | — | — | — | — | — | 300 | — | — |
| Parts by weight melamine | — | 28.2 | 10.1 | 5.0 | 48.3 | 28.5 | 28.1 | 20 | 20 | 250 | 250 | 250 | 250 | 300 | 300 |
| Parts by weight phosphate | — | — | 7.0 | 5.5 | 6.6 | — | 7.5 | — | 5 | — | 20 | 10 | — | 100 | 100 |
| Parts by weight Al-hydroxide | — | 28.2 | 35.5 | 38.6 | 5.0 | 28.5 | 28.1 | 20 | 20 | 210 | 210 | 250 | 250 | 300 | 300 |
| Parts by weight hollow Si-beads | — | — | — | — | — | — | — | — | — | 920 | 920 | — | — | — | — |
| Parts by weight H₂O | 35.7 | 36 | 38 | — | 30 | — | — | 30 | — | 1110 | 210 | 400 | 350 | 460 | — |
| Parts by weight 20% latex | — | — | — | 45.5 | — | 40 | 40 | — | 41 | — | 920 | — | — | — | 375 |
| approx. bulk density | 1 | 1 | 1 | 1 | 1 | 1 | 1 | 1 | 1 | 0.75 | 0.75 | 1.1 | 1.1 | 1.1 | 1.1 |

-continued

| Example No | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| g/cm$^3$ | | | | | | | | | | | | | | | |
| Minutes to 100° C. | 25 | 18 | 15 | 18 | 20 | 18 | 18 | 17 | 23 | 28 | 27 | 16 | 15 | 20 | 23 |
| 150° C. | 36 | 41 | 45 | 48 | 45 | 42 | 45 | 40 | 60 | 90 | 100 | 45 | 40 | 57 | 61 |
| 180° C. | 45 | 71 | 85 | 120 | 75 | 90 | 101 | 69 | 120 | 120 | 120 | 78 | 70 | 135 | 140 |

*smooth plaster
**anhydrite

The boards were all adjusted to a specific gravity of 1 in order to allow fair comparison.

Example 1 serves as a comparison Example and demonstrates the heat transmission properties of a normal gypsum board.

Example 2 shows the improvement to the heat transmission behaviour according to the invention and Example 3 shows the further improvement by addition of phosphate and Example 4 by addition of the polymer latex. The positive role is also documented in Examples 2, 6 and 7 and in Examples 8 and 9 or 10 and 11, the latter being carried out with conventional commercial retarded gypsum plaster.

The Examples demonstrate the suitability of the fire-proofing sealing compounds according to the invention for sealing cracks in fire walls or for guiding cables through walls, and the combination with intumescent fire-proofing materials should be indicated to a particular extent in this case. As the boards or fillings produced with polymer lattices for example according to Example 4, on the one hand are not hard and can be drilled but, on the other hand, do not tend to raise dust, as demonstrated by machining with a drilling machine, they are also suitable for sealing cable ducts with the possibility of reinstallation in chambers having dust-sensitive relays and the like. They can easily be painted with any paint once they have dried.

A combination according to Example 10 or 11 or Example 8 or 9 is suitable as a particularly effective surface plaster for fire-proofing purposes or for the production of flame-retarding semi-finished products, shaped articles and mortars.

The combination according to Example 3 or 4 can be prevented from setting by prolonged stirring for more than 5 hours at ambient temperature, producing a putty-like paste which can be applied, for example, from a putty gun which then dries to a hard material with a certain elasticity and good fire-resistant capacity.

I claim:

1. A flame-retarding sealing compound consisting essentially of
   (a) 10 to 50 weight % of a hydraulic binder selected from the group consisting of alpha-gypsum, beta-gypsum, plaster of Paris, plastering gypsum and anhydrite,
   (b) 20 to 60 weight % of a dehydratable filler selected from the group consisting of aluminium hydroxides, aluminium hydrated oxides and hydrated aluminas,
   (c) 10 to 60 weight % of a melamine selected form the group consisting of 2,4,6-triamino-s-triazine and salts of 2,4,6-triamino-s-triazine, said melamine being such that upon thermal decomposition said melamine simultaneously gives off basic gases which are capable of bonding hydrogen halides, said melamine being such that said melamine consumes energy during thermal decomposition and said melamine being capable of melting, subliming and decomposing under thermal decomposition,
   (d) 3 to 30% by weight of a polymer dispersion having a film forming temperature between −15° C. and +40° C. and
   (e) optionally a pigment or an inorganic phosphorous-containing compound as a phosphoric acid donor in an amount of 5 to 35% by weight.

2. A sealing compound according to claim 1, wherein the sum of the parts by weight of melamine plus dehydratable filler corresponds at least to the parts by weight of hydraulic binder in the compound.

3. A sealing compound according to claim 1, containing fillers having pores or cavities.

4. A shaped article produced using, alone or in a combination, the sealing compounds according to claim 1.

5. A sealing compound according to claim 1, wherein the polymer dispersion comprises a polymer selected from the group consisting of polyurethanes, butadiene copolymers, vinylantate copolymers and polyacrylic acid esters.

* * * * *